INVENTOR
DONELSON B. HORTON

United States Patent Office 3,339,843
Patented Sept. 5, 1967

3,339,843
DYE MARKER APPARATUS
Donelson B. Horton, Madison, Ala., assignor to John Blue Company, Incorporated, Huntsville, Ala., a corporation of Alabama
Filed Aug. 3, 1965, Ser. No. 476,920
4 Claims. (Cl. 239—157)

ABSTRACT OF THE DISCLOSURE

Apparatus is provided for dispensing liquid fertilizer and a liquid dye from a spray boom attached to a vehicle which can move over earth to be treated. The dye is carried in a relatively small container and a concentrated solution is used, and the dye is pumped to a spray nozzle associated with the spray boom and discharged with liquid fertilizer which is being separately pumped to the nozzle. The dye and the liquid fertilizer are pumped at rates which are related to one another and also to the ground speed of the vehicle which carries the boom.

Brief discussion of invention

This invention relates to dispensing apparatus for dispensing liquid dye from a vehicle to the ground, and in particular this invention relates to a dye dispenser for use with a fertilizer dispenser. The dye dispenser of this invention is carried by the same vehicle which carries a fertilizer dispensing apparatus, and means are provided for metering small quantities of dye into a part of the fertilizer dispenser in such a way that the dye will mark the areas covered by fertilizer.

It has been proposed to mark the fertilized areas of a field by incorporating a dye material in the fertilizer itself or by carrying a separate quantity of dye solution on a fertilizer trailer to cover the fertilized area with the dye. The prior methods for marking a field with a dye have had the disadvantage of requiring a rather large quantity of dye solution to be carried by the vehicle which applied the liquid fertilizer. This required hauling of additional water to the field location and periodic stops were necessary to replenish the dye solution. The prior art apparatus is limited in use because very large quantities of dye solution are necessarily pumped by the existing pumps and devices used with such dispensing systems, and the high cost of dye and the separate handling and mixing has prevented a widespread use of dye marking materials in the usual fertilizing operations.

This invention provides novel pumping apparatus for use in combination with a conventional liquid fertilizer dispensing system, and the dye pump is constructed to meter very small quantities of dye solution into a selected part of the fertilized area so as to mark the boundaries of that area. By metering and controlling the quantity of dye used, it is possible to carry a relatively small tank of dye solution on the usual dispensing vehicle, and economies are realized in the small amount of dye used as compared to prior systems.

The conventional fertilizer dispensing system includes a large fertilizer reservoir tank which may hold approximately 300 gallons of fertilizer solution. A high capacity pump is used to pump the fertilizer solution from the tank to a spray boom which dispenses the fertilizer through a plurality of nozzles for covering and treating a broad surface area. The tank and spray boom may be carried on a vehicle which is towed or driven over a field and the movement of the vehicle may provide the driving means for operating the high capacity pump. The present invention adds to the conventional system a small, low capacity pump which is driven off from the main fertilizer pump. A small dye solution tank having a capacity of only one to two gallons is carried on the dispensing vehicle as a reservoir for the dye solution. A hose is connected between the dye solution tank and at least one of the terminal ends of the spray boom. In its preferred embodiment, the present invention carries the dye solution to one or more of the dispensing nozzles which normally dispense fertilizer solution from the spray boom.

The invention also provides for a novel nozzle construction in which the dye solution is mixed with fertilizer solution for ultimate dispensing from a spray boom. The nozzle is constructed to maintain a low pressure mixing chamber for receiving very small quantities of dye solution while at the same time receiving relatively large quantities of fertilizer solution under a high pressure. It is important that the mixing chamber maintain a relatively low pressure to prevent the fertilizer solution from backing up into the inlet for dye solution, and the nozzle is constructed to achieve this relationship. In addition, the nozzle includes an outlet construction which dictates a flat, broad pattern of liquid material sprayed from the nozzle.

The low capacity pump which is used to meter small quantities of dye solution to the spray boom is constructed without any valves or gates as usually found in pumps. The low capacity pump operates by squeezing a flexible dye conduit in a progressive manner so as to move solution through the conduit in a single direction. The pump operates entirely by applying external forces to the conduit, and the dye solution does not contact any of the parts which make up the pump. As a result, the pump is more reliable for pumping dye solution, and there is no loss of time required for cleaning or repairing the pump.

These and other advantages of the invention will become apparent from the more detailed discussion which follows. In the detailed discussion, reference will be made to the accompanying drawings in which.

Detailed description of invention

Figure 1:
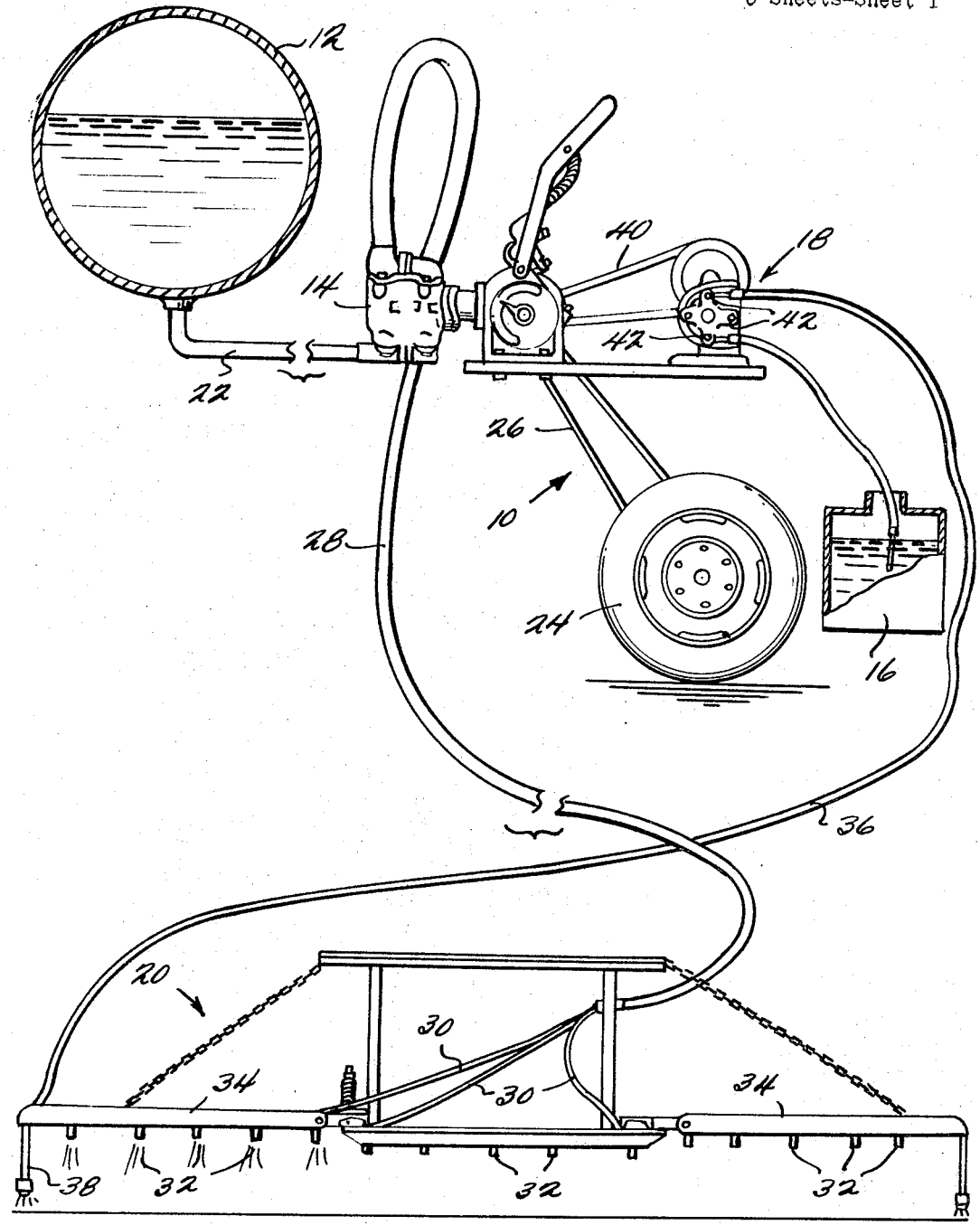
FIGURE 1 represents a general schematic view of the various components which comprise the fertilizer and dye dispensers of this invention.

Referring to FIGURE 1, there is provided a trailer 10 or other vehicle which can be moved over the ground, and the trailer supports a fertilizer solution tank 12, a high capacity pump 14 for pumping the fertilizer solution, and a small dye tank 16 with a low capacity pump 18 for pumping the dye solution. The usual trailer used in a fertilizer spraying system also carries a spraying boom 20 for dispensing the liquid fertilizer through a plurality of outlets and across a broad surface area to be treated. The spraying boom 20 may be carried on a separate vehicle or attached to the trailer which carries the tank and pump means.

The fertilizer tank 12 is normally of a large capacity, for example 300 gallons, so that a number of trips may be made back and forth across a field from a single filling of the tank 12. A conduit means 22 carries liquid fertilizer from the fertilizer tank 12 to the high capacity pumping means 14. The high capacity pump is of any conventional design, and may be of the type which includes impeller elements which rotate within a casing to pump a liquid. The pumping means 14 is preferably driven from a ground engaging wheel 24 of the trailer by an interconnected chain or belt drive 26. It is possible to drive the pump 14 from a separate power source, such as an electric or gasoline motor, but in the preferred arrangement the pump is driven from the ground engaging wheel so that the rate of pumping will be regulated in proportion to the speed of movement over the ground. This arrangement assures the proper amount of fertilizer solution being applied over a given surface area. The high capacity pump 14 has an outlet conduit 28 which leads to the spraying boom 20. At some convenient point before its connection with the spraying boom, the conduit 28 is coupled with a plurality of smaller hoses 30. The smaller hoses 30 lead to the separate sections of the spray boom for conveying material to dispensing nozzles 32, and approximately equal quantities of fertilizer solution are delivered to the various dispensing nozzles located along the spraying boom 20. The spraying boom 20 is of a standard construction, and may include arm extensions 34 which can be raised or lowered about pivotal mounting points so as to increase or decrease the length of the boom. Suitable valving devices may be associated with the various sections of the boom so that liquid fertilizer can be shut off from any desired section.

The dye dispensing apparatus associated with the conventional fertilizer dispenser includes a small, one to two gallon tank 16 which may be carried on the trailer 10. A single conduit means 36 leads from the dye tank 16 to one or more of the spray nozzles 32 which are mounted on the spray boom 20. In the preferred arrangement, the dye conduit means 36 leads to only a single spray nozzle at a terminal end of the spray boom. Thus dye is delivered to one of the outer ends of the boom and is dispensed with fertilizer so as to mark the limit of spraying at that end of the boom. The dye will leave a line mark along the outer margin of the ground which has been treated, and the spray boom operator can align his vehicle and the boom with the line upon a return trip across the field. As shown in FIGURE 1, the dye conduit 36 leads to a nozzle 38 which is mounted on the end of the boom, and which comprises a novel mixing nozzle for mixing the dye solution with fertilizer solution. Dye solution is pumped from the dye tank 16 by a low capacity squeeze pump 18. The low capacity pump 18 is mounted in close proximity to the fertilizer pump 14 so that it may be driven by a belt or chian 40 from the larger pump 14. In this manner the low capacity pump meters dye solution in direct proportion to the amount of fertilizer being pumped through the pump 14. The low capacity pump 18 is constructed to progressively squeeze the dye conduit 36 in a direction which will cause the flow of solution through the conduit in a single direction only. The pump 18 includes force applying members 42 which can be brought into sequential engagement with the external surface of the dye conduit 36 to squeeze the conduit and force the flow of dye solution therethrough. It can be appreciated that this type of pump offers great reliability in metering very small quantities of dye solution to a dispensing nozzle, and the pump is characterized by its simplicity of construction and low cost of repair and maintenance.

Figure 4:
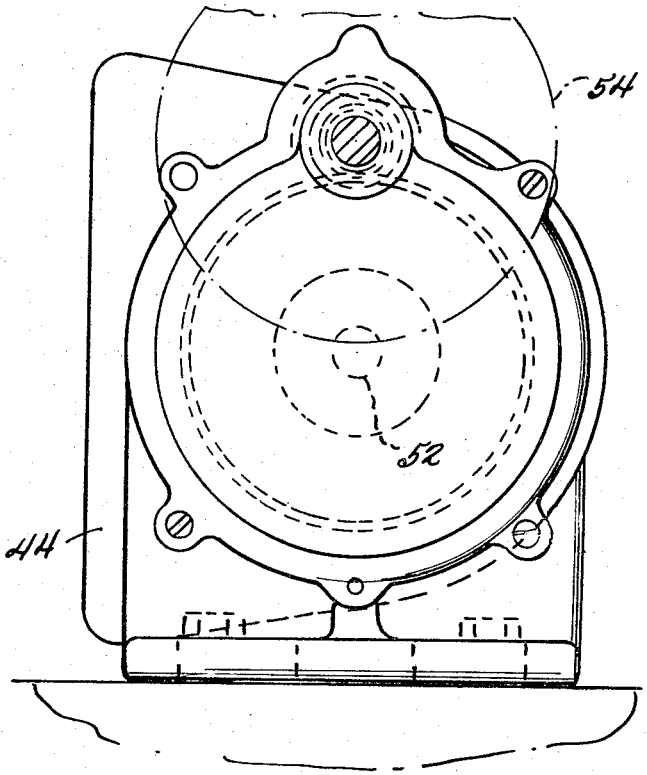
FIGURE 4 is a back elevational view of the pump of FIGURE 2.
Figure 2:
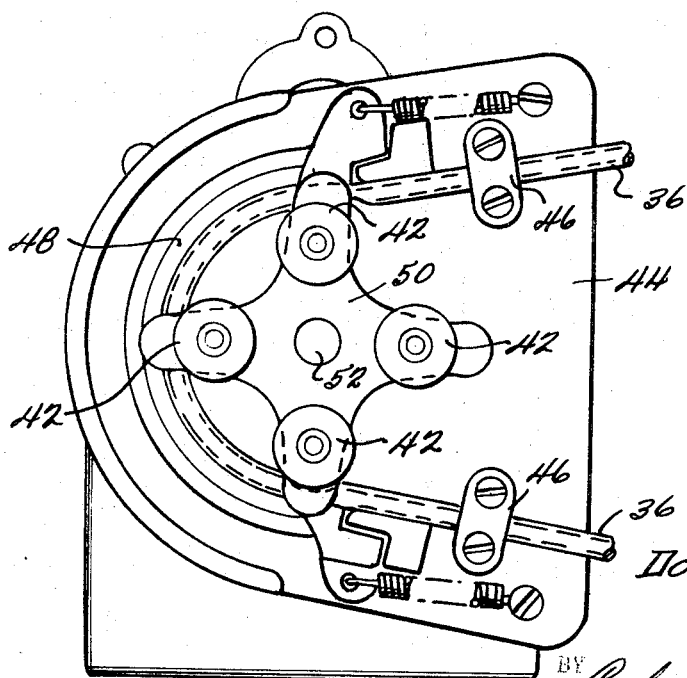
FIGURE 2 is a detailed front elevational view of the low capacity squeeze pump which pumps the dye solution.
Figure 3:
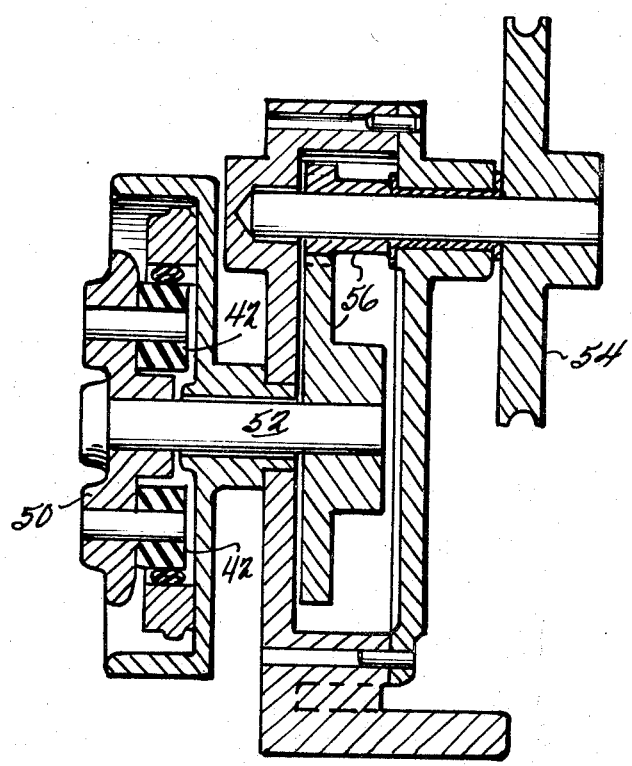
FIGURE 3 is a vertical cross section of the squeeze pump taken on line 3—3 of FIGURE 2.

FIGURES 2 through 4 show the small capacity pump 18 in greater detail. The pump includes a flat plate member 44 against which the dye solution conduit 36 may be placed so that it can be acted upon by the force applying members 42 of the pump. The dye solution conduit 36 is placed on the plate 44 so as to define a curved path against which the force applying members may progressively engage and follow the conduit for a sufficient distance to assure progressive squeezing of the conduit in a pumping fashion. The curved path of the conduit 36 is maintained by clamping the conduit against the back plate with clamping means 46. Additionally, a spring-loaded curved backing member 48 is mounted on the plate 44 so as to define the outer limits of movement for the dye conduit 36. The spring-loaded curved member 48 also provides a solid backing member against which the force applying means 42 of the pump may squeeze the dye solution conduit. The force applying members 42 are shown as rollers which are mounted on a rotatable element 50, and a rotatable axle member 52 is driven by a drive sheave 54 through reduction gears 56. The reduction gears may give a four to one gear reduction so that the limited pumping capacity of the pump is carefully controlled. As discussed above, the drive sheave 54 is driven by a drive belt or chain 40 from a suitable driving part of the large capacity pump 14.

From the above description, it can be seen that the fertilizer and dye solutions are proportionately pumped by their respective pumping means in accordance with the rate of travel of the trailer 10 over the surface of the ground. Fertilizer solution is pumped at a relatively high pressure and in large quantities to the plurality of nozzles 32, and the dye solution is metered in carefully controlled quantities to a single mixing nozzle 38. The mixing nozzle 38 is shown in greater detail in FIGURE 5, and the nozzle includes a unique mixing chamber which controls the careful mixing of small quantities of dye with the larger quantities of fertilizer solution passing through the nozzle.

Figure 5:
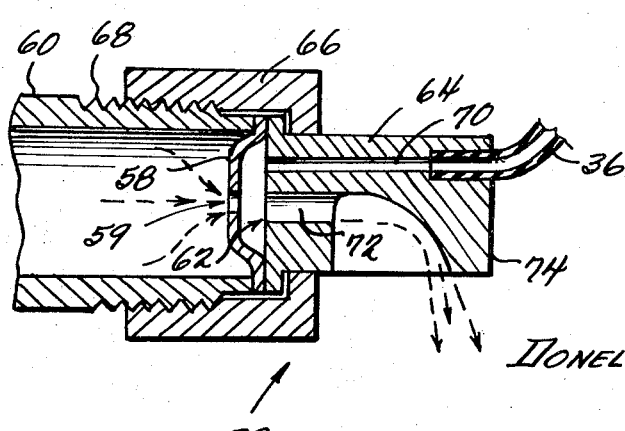
FIGURE 5 is a cross section showing the detailed construction of a dispensing nozzle used with this invention for mixing dye solution with fertilizer solution.

The nozzle structure includes a disc 58 which can be placed at the outlet end of the fertilizer dispensing tube 60. The disc 58 includes a central aperture 59 through which liquid fertilizer must pass in its flow through the nozzle structure. The disc 58 is so related to the remainder of the nozzle structure that a mixing chamber 62 is formed between the disc and the rest of the nozzle. This mixing chamber may be formed by molding a hollow area into a part of the nozzle outlet, or it may be formed by using a dished disc 58 as shown in FIGURE 5. In assembling the nozzle, the disc 58 is placed at the terminal end of the fertilizer tube 60, a nozzle outlet member 64 is placed in axial alignment with the dispensing tube 60 and the disc 58, and a threaded sleeve member 66 is threaded onto the end of the fertilizer dispensing tube 60 so as to hold the various nozzle components in correct relationship to one another. Of course, external threads 68 are provided on the surface of the fertilizer dispensing tube 60 so that the sleeve member 66 can be threaded upon the end of that tube. The nozzle outlet member 64 includes an inlet bore 70 for receiving dye solution from the dye conduit 36. The inlet bore 70 communicates with the mixing chamber 62 so that dye solution is admitted into that chamber together with dye solution which is passing through the central orifice 59. The nozzle outlet member 64 also includes an outlet 72 through which the mixture of dye and fertilizer solutions may pass for spraying onto the ground. It is important that the cross-sectional area of the outlet 72 be greater than the cross-sectional area of the fertilizer orifice 59 so that the pressure within the mixing chamber 62 remains at a lower level than the fluid pressure of the incoming dye solution in the bore 70. Previous mixing nozzle structures have had the disadvantage of being inoperative when one solution is being admitted for mixing at a relatively low pressure as compared to the pressure of a second solution. If the pressure within the mixing chamber is at the pressure of the fertilizer solution, there is the danger that fertilizer solution will back up into the dye inlet bore 70 and prevent the mixture of any dye with the fertilizer solution. This problem arises only when very low capacity pumping means are used for pumping the dye solution into the mixing chamber, and the pumping means of this invention necessarily pumps at a low pressure level in order to meter limited quantities of dye to the mixing nozzle. The nozzle outlet member 64 also includes a broad deflector portion 74 which deflects the dispensed mixture of fertilizer and dye solutions into a broad, flat spray pattern. This pattern is desirable in apparatus of this type where a plurality of dispensing nozzles are required to cover a broad surface of ground evenly and without overlapping the dispensed material between adjacent nozzles. The deflector portion 74 may be formed integrally with the nozzle outlet member 64 as by molding, and it will be appreciated that the dye inlet bore 70 and the outlet 72 may be easily formed in the molded nozzle outlet member.

Although the invention has been described with reference to a single embodiment, it is contemplated that other embodiments will occur to those skilled in the art, and such variations are intended to be within the scope of this invention.

What is claimed is:

1. In apparatus for dispensing fertilizer from a spraying boom and for marking the limits of application of the fertilizer said apparatus being mounted on a vehicle which can be drawn or propelled over the ground, and including a system for conveying liquid fertilizer to spray nozzles associated with said spraying boom, the improvement comprising:
    a relatively small storage tank for containing concentrated dye solution,
    a continuous hose leading from said storage tank to the spraying boom for carrying dye solution to the spraying boom,
    a low capacity squeeze pump interposed along the length of said continuous hose for squeezing said hose and pumping dye solution from said storage tank, through the hose, and to the spraying boom, and
    drive means for driving said low capacity squeeze pump, said drive means for the low capacity squeeze pump being connected to a drive means associated with the dispensing system for fertilizer, and including means for relating both drive means to the ground speed of the vehicle on which the apparatus is mounted, whereby the dye solution will be dispensed at a rate which is related to the dispensing rate for the liquid fertilizer and to the ground speed of the vehicle.

2. The combination of claim 1 wherein said continuous hose leads from the dye storage tank to a spray nozzle associated with the dispensing of fertilizer from said spraying boom, whereby dye solution is mixed with fertilizer at the point of dispensing the fertilizer through said nozzle.

3. The apparatus of claim 1 wherein said low capacity squeeze pump comprises:
    a plurality of squeeze elements which can be brought into progressive and successive engagement with a surface portion of said continuous hose,
    means for driving said plurality of elements into successive engagement with the hose, whereby fluid within said hose is impelled in the direction of progression of said squeeze elements, and
    backing means carried by the pump to prevent displacement of said hose upon engagement of a squeeze element therewith.

4. The apparatus of claim 1 wherein said continuous hose leads to one terminal end only of said spray boom, whereby only that margin of fertilizer application is marked by dye.

References Cited
UNITED STATES PATENTS

| | | | |
|---|---|---|---|
| 219,421 | 5/1940 | Stevens | 239—172 |
| 2,520,680 | 8/1950 | Hamilton | 239—172 |
| 2,659,625 | 11/1953 | Gramatky | 239—157 |
| 3,083,913 | 4/1963 | Coffman et al. | 239—155 |
| 3,105,447 | 10/1963 | Ruppert | 103—149 |
| 3,176,622 | 4/1965 | Pfeiffer | 103—149 |
| 3,211,381 | 10/1965 | Rasmussen | 239—159 |

FOREIGN PATENTS

| | | |
|---|---|---|
| 1,107,682 | 8/1955 | France. |

EVERETT W. KIRBY, *Primary Examiner.*